United States Patent
Coatney et al.

(10) Patent No.: US 7,890,810 B1
(45) Date of Patent: Feb. 15, 2011

(54) METHOD AND APPARATUS FOR DETERMINISTIC FAULT INJECTION OF STORAGE SHELVES IN A STORAGE SUBSYSTEM

(75) Inventors: Douglas W. Coatney, San Jose, CA (US); Wayne A. Booth, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 380 days.

(21) Appl. No.: 12/037,818

(22) Filed: Feb. 26, 2008

(51) Int. Cl.
*G06F 11/00* (2006.01)
(52) U.S. Cl. .................................................. 714/41
(58) Field of Classification Search ................ 714/41
See application file for complete search history.

(56) References Cited

U.S. PATENT DOCUMENTS 7,665,071 B1 * 2/2010 Roles et al. ................. 717/130
2004/0158771 A1 * 8/2004 Garnett et al. ................ 714/14
2005/0022064 A1 * 1/2005 Steinmetz et al. ............ 714/42
2005/0050387 A1 * 3/2005 Mariani et al. ............... 714/13

* cited by examiner

*Primary Examiner*—Scott T Baderman
*Assistant Examiner*—Yair Leibovich
(74) *Attorney, Agent, or Firm*—Blakely, Sokoloff, Taylor & Zafman LLP

(57) ABSTRACT

A method and system for injecting a deterministic fault into storage shelves in a storage subsystem. The method comprises injecting a known fault condition on demand into a hardware component in a storage shelf to cause a failure of the storage shelf. The hardware component incorporates a circuit that is configurable to select between a normal operating condition and a faulty condition of the hardware component. The method further comprises verifying that a reported failure is consistent with the known fault condition.

16 Claims, 7 Drawing Sheets

METHOD AND APPARATUS FOR DETERMINISTIC FAULT INJECTION OF STORAGE SHELVES IN A STORAGE SUBSYSTEM

FIELD OF THE INVENTION

At least one embodiment of the invention pertains to storage systems, and more particularly, to deterministic fault injection of storage shelves in a storage subsystem.

BACKGROUND

Various forms of network-based storage systems exist today. These forms include network attached storage (NAS), storage area networks (SANs), and others. Network storage systems are commonly used for a variety of purposes, such as providing multiple users with access to shared data, backing up critical data (e.g., by data mirroring), and the like.

A network-based storage system typically includes at least one storage server, which is a processing system configured to store and retrieve data on behalf of one or more client processing systems ("clients"). A storage server may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups. A storage server provides clients with file-level access. Some storage servers may additionally provide block-level access.

Current filers are generally packaged in either of two main forms: 1) an all-in-one custom-designed system that is essentially a standard computer with built-in disk drives, all in a single chassis ("enclosure"), or 2) a modular system in which one or more sets of disk drives, each in a separate chassis, are connected to an external filer in another chassis. A modular system can be built up by adding multiple chassis in a rack, and then cabling the chassis together. The disk drive enclosures in a module system are often called "shelves" or "storage shelves."

To improve the reliability of storage shelves, it is generally necessary to test various fault conditions in the shelf hardware. The test may be conducted at design validation time and/or after shipment of the final product. The fault conditions may be caused by a failure in the microprocessors, shelf electronics, or communication links in a storage shelf. When a fault occurs in a storage shelf, a report is sent to the filer for analysis and for invoking corrective measures. Conventionally, a fault condition is tested by running hundreds of thousands of test patterns, in the hope that some of the test patterns will trigger a fault condition. There is no guarantee that any of the test patterns will cause a specific fault to occur. Thus, the conventional technique is time-consuming and cannot fully validate specific fault conditions.

SUMMARY OF THE INVENTION

The present invention includes a method and system for injecting a deterministic fault into storage shelves of a storage subsystem. The method comprises injecting a known fault condition on demand into a hardware component in a storage shelf to cause a failure of the storage shelf. The hardware component incorporates a circuit that is configurable to select between a normal operating condition and a faulty condition of the hardware component. The method further comprises verifying that a reported failure is consistent with the known fault condition.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
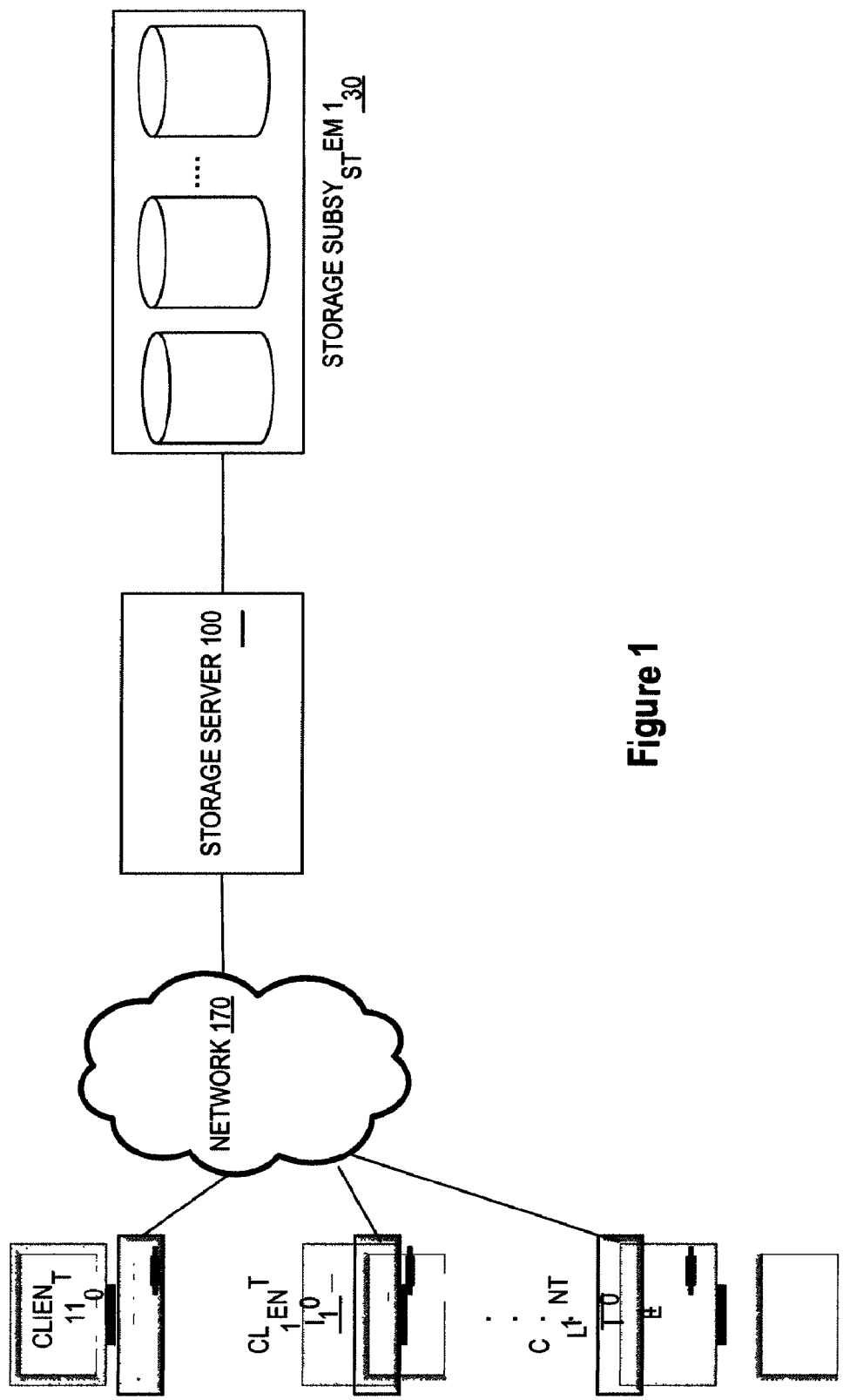
FIG. 1 illustrates a network environment which includes a storage server coupled to a storage subsystem.

A method and apparatus for deterministic fault injection of storage shelves in a storage subsystem are described. References in this specification to "an embodiment", "one embodiment", or the like, mean that the particular feature, structure or characteristic being described is included in at least one embodiment of the present invention. However, occurrences of such phrases in this specification do not necessarily all refer to the same embodiment.

The technique described herein enables a user to cause deterministic hardware failure or malfunction on demand. The technique allows an engineer to cause one hardware component to fault at a time, and see whether the fault is detected within the storage subsystem properly. Once the subsystem detects and handles the fault, it can be verified whether the fault is propagated upwards to the storage server (i.e., the filer). The hardware is designed to incorporate error cases in addition to normal functionality. The hardware failure or malfunction can be induced, illustratively, at a design validation phase when the hardware is checked for compliance with the customer's specification, or at a re-certification phase as part of a regression test when the hardware is tested for quality assurance after a hardware upgrade. In particular, the technique described herein validates an error reporting mechanism which reports or indicates the presence of a fault to an external system or an administrator. In one embodiment, a reported fault is compared with the fault induced on demand to determine whether the report is correct. Visual indicators of the faults can also be validated to determine whether they are activated consistently with the fault induced on demand.

In one embodiment, the technique described herein integrates a control circuit into a hardware module as part of the final hardware design. The control circuit injects faults into a target component on the hardware module during a test. At other times, when a test is not conducted, the existence of the control circuit on the hardware module does not affect the normal operating condition of the hardware module. That is, under the normal operating condition, the hardware module functions as designed without generating a fault. During a test, the control circuit establishes a connection between the target component and a fault signal source in response to an input. The control circuit uses the input to select an input line of the target component and one of a plurality of signal sources to establish the connection. The selected connection induces (or injects) a deterministic fault condition in the target component to cause the target component to fail. As a result, the behavior of the failed module, as well as the error report and recovery measures for the failed module, can be validated based on the known fault condition. Thus, the incorporation of the control circuit allows validation of specific fault conditions which otherwise may not be possible.

The use of the control circuit is not limited to storage shelf components. In general, the control circuit can be incorporated into any hardware module to test any hardware component that receives signals from a source external to the hardware component. A fault can be injected into a variety of input lines (such as a clock line, a reset line, a power line, a communication link, or the like) of a hardware component to cause a failure. Illustratively, grounding the clock input, holding the reset line enabled, withholding the power, or shorting an I²C communication link, will cause any hardware component to behave abnormally. The reported abnormal behavior and the injected fault can then be compared to validate the error reporting mechanism.

In the context of a storage subsystem, the technique described herein can cause systematic failure or malfunction in the hardware modules on each storage shelf. Illustratively, the hardware modules may include an I/O module, a power module, a disk drive module, and the like. A fault is injected into a hardware component residing on the hardware module. The hardware component may be a microprocessor, an Application Specific Integrated Circuit (ASIC), a communication line, or the like. The technique allows an external test controller to select a specific fault condition, and then verify the error report or error indication for that fault condition. The error report may be a status report that is sent back to a host for error analysis. The error indication may be a visual indicator (such as a Light Emitting Diode (LED)) that is activated to indicate a fault condition associated with the indicator. Having the ability to cause any of these errors to occur on demand allows for targeted validation of the error reporting mechanism of a storage subsystem.

FIG. 1 shows an example of a network environment in which a storage server 100 operates. The storage server 100 can be a file server or "filer," in which the technique introduced herein can be implemented. It should also be noted that the technique described herein can be applied in other types of storage systems, such as storage servers, which provide clients with either or both of block-level access and file-level access to stored data or processing systems other than storage servers, and network devices configured to provide storage services.

Referring to FIG. 1, the storage server 100 is coupled to a storage subsystem 130 which includes an array of mass storage devices (e.g., disks), and to a set of storage clients 110 (hereinafter simply "clients") through a network 170. The network 170 may be, for example, a local area network (LAN), a wide area network (WAN), a metropolitan area network (MAN), a global area network (GAN), such as the Internet, a Fibre Channel fabric, or the like, or a combination of any such types of networks. Each of the clients 110 may be, for example, a conventional personal computer (PC), server-class computer, workstation, or the like.

The storage subsystem 130 is managed by the storage server 100. The storage server 100 receives and responds to various read and write requests from the clients 110, directed to data stored in or to be stored in the storage subsystem 130. The mass storage devices in the storage subsystem 130 may be, for example, conventional magnetic disks, optical disks such as CD-ROM or DVD-based storage, magneto-optical (MO) storage, or any other type of non-volatile storage devices suitable for storing large quantities of data.

Although illustrated as a self-contained element, the storage server 100 may have a distributed architecture; for example, it may include a separate N- ("network") module and D- ("data") module (not shown). In such an embodiment, the N-module is used to communicate with clients 110, while the D-module includes the file system functionality and is used to communicate with an associated one of the storage subsystems 130. The N-module and D-module can communicate with each other using an internal protocol. Alternatively, the storage server 100 may have an integrated architecture, where the network and data components are all contained in a single box. The storage server 100 may also be coupled through a switching fabric to other similar storage servers (not shown) which have their own local storage subsystems. In this way, all of the storage subsystems 130 can form a single storage pool, to which any client of any of the storage servers has access.

Illustratively, the storage server 100 may be a storage server product of Network Appliance, Inc., Sunnyvale, Calif., that uses the NetApp® Data ONTAP™ storage operating system. However, it is expressly contemplated that any appropriate storage server and storage operating system may be enhanced for use in accordance with the technique described herein.

In one embodiment, the storage server 100 and the storage subsystem 130 form a modular system. That is, one or more sets of mass storage devices (e.g., disk drives), each in a separate chassis ("enclosure"), are connected to the storage server 100 in another chassis. The enclosures for the mass storage devices are herein referred to as "shelves" or "storage shelves."

Figure 2:
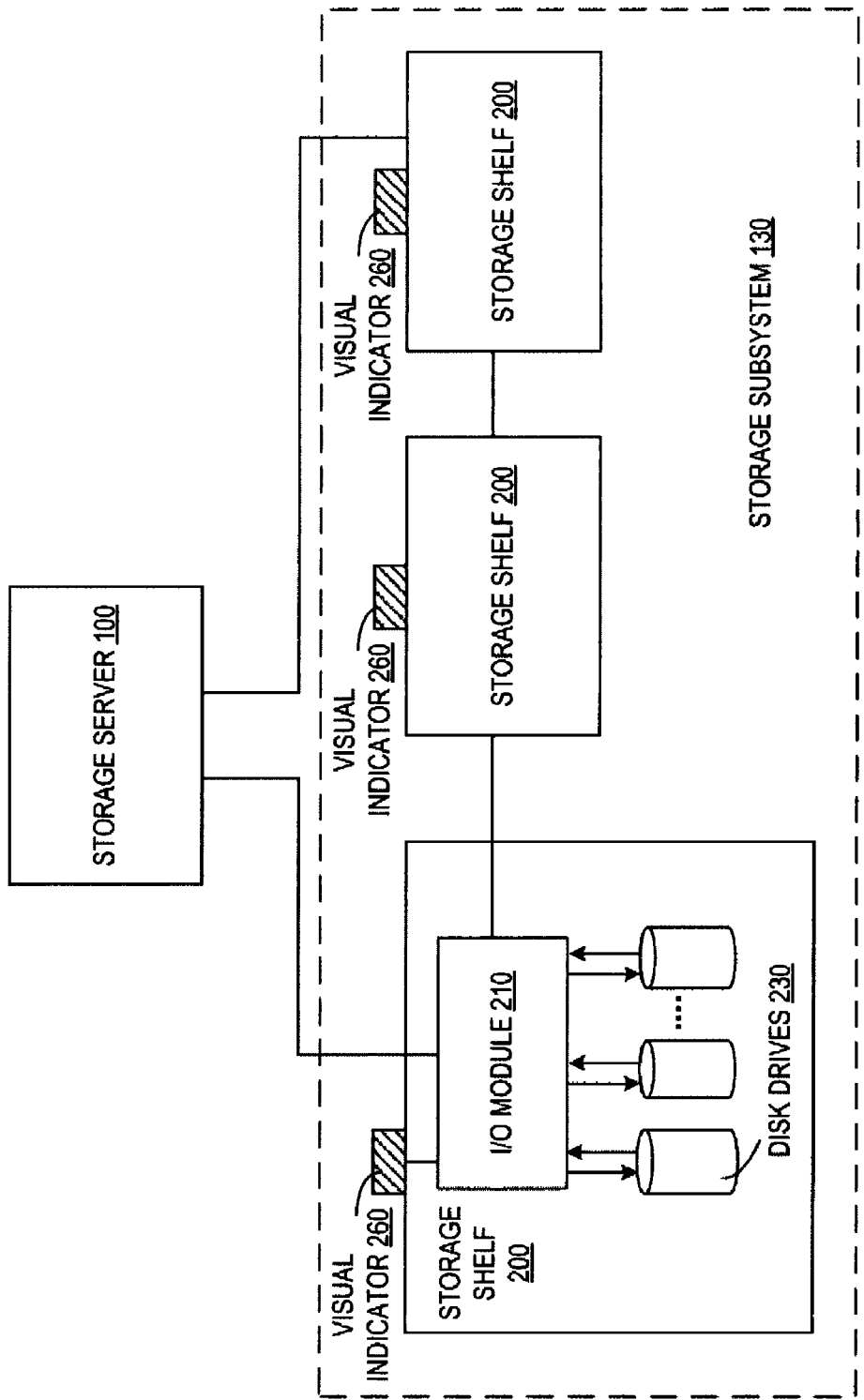
FIG. 2 is a block diagram illustrating an example of storage shelves in the storage subsystem.

Referring to FIG. 2, the storage server 100 is coupled to a number of the external storage shelves 200, illustratively, in a loop topology. A person of ordinary skill in the art would appreciate that the technique described herein can be applied to any storage shelf topology, including, but not limited to, Fibre Channel-Arbitrated Loop (FC-AL), Serial Attached Small Computer System Interface (SAS), Internet Small Computers Systems Interface (iSCSI), and the like. Each storage shelf 200 contains multiple disk drives 230 operated under control of the storage server 100 according to Redundant Arrays of Independent Disks (RAID) protocols. Note that FIG. 2 shows a simple network configuration characterized by a single loop with three storage shelves 200 in it; however, other network configurations are possible. For example, there can be a greater or smaller number of storage shelves 200 in the loop; there can be more than one loop attached to the storage server 100; or, there can be one loop for every storage shelf 200.

In FIG. 2, each of the storage shelves 200 can be assumed to have the same construction. Each storage shelf 200 includes multiple disk drives 230. Each storage shelf 200 also includes at least one I/O module 210, which is connected between two adjacent storage shelves 200 in the loop, or, in some cases (depending on where the shelf 200 is placed in the loop), is connected between an adjacent storage shelf 200 and the storage server 100. The I/O module 210 serves as a communications interface between the storage server 100 and the disk drives 230 in the storage shelf 200. The functionality of the I/O module 210 is described further below. The disk drives 230 in the storage shelf 200 can be connected to the I/O module 210 by a standard Fibre Channel connection. In one embodiment, each storage shelf is coupled to one or more visual indicators 260 (e.g., Light Emitting Diodes (LEDs)), which are activated when a failure is detected in that shelf 200.

Figure 3:
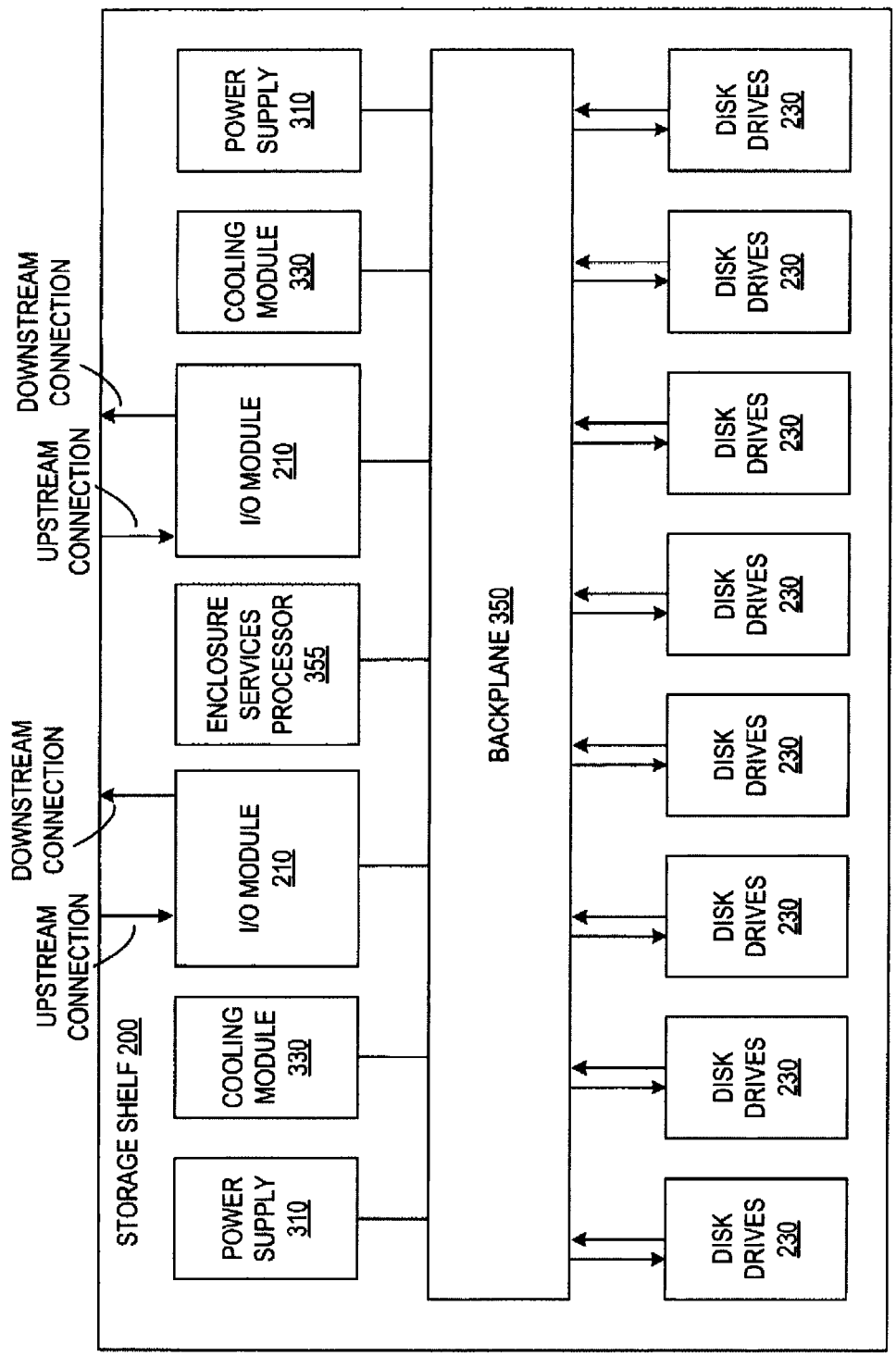
FIG. 3 is a block diagram illustrating an example of the hardware architecture of a storage shelf.

FIG. 3 is a block diagram illustrating an example of the storage shelf 200 of FIG. 2. As shown, all of the major components of the storage shelf 200 are connected to, and communicate via, a backplane 350. The backplane 350 is "passive" in that it has no active electronic circuitry mounted on or in it. The backplane 350 may include one or more substantially planar substrate layers (which may be conductive or which may be dielectric with conductive traces disposed on/in it), with various pin-and-socket type connectors mounted on it to allow connection to other components in the storage shelf 200.

Connected to the backplane 350 in the storage shelf 200 of FIG. 3 include, but are not limited to, an enclosure services processor 355, several individual disk drives 230, redundant power supplies 310 and associated cooling modules 330, and one or more I/O modules 210 (two are shown) described above in FIG. 2. Normally, only one I/O module 210 is necessary for the communication between the storage server 100 and the disk drives 230 in the storage shelf 200. The multiple I/O modules 210 and power supplies 310 provide redundancy and improve reliability of the storage shelf 200. The service processor 355 collects and verifies error conditions within the shelf 200, and sends an error report to the storage server 100.

Figure 4A:
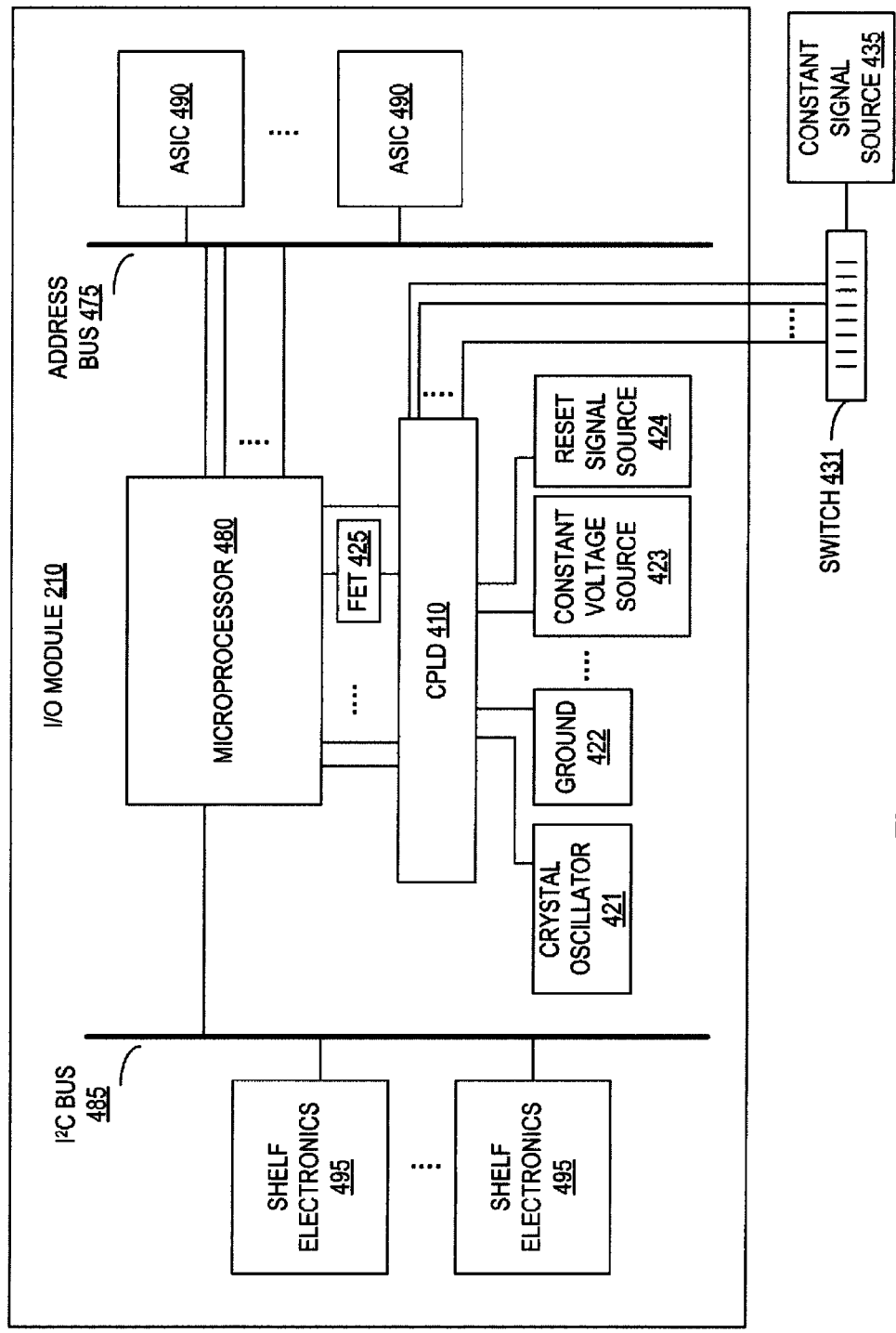
FIG. 4A is a block diagram illustrating one embodiment of a fault injection mechanism implemented in a hardware module of the storage shelf.

FIG. 4A shows a fault injection mechanism implemented on a circuit board according to an embodiment of the invention. For illustration purposes, the fault injection mechanism is shown to be implemented on the I/O module 210 of one of the storage shelves 200. However, it is noted that the fault injection mechanism can be implemented on other hardware modules in the storage shelf 200. For example, the fault injection mechanism can be incorporated into the power supplies 310, the cooling modules 330, disk drives 230, the buses, or any electronics on the shelf 200 that receive external signals, such as clock signals, reset signals, or the like. The fault injection mechanism can also be incorporated into the circuit boards in the storage server 100, as well as any general circuit board that receives external signals.

Referring to FIG. 4A, a programmable logic device (e.g., a Complex Programmable Logic Device (CPLD) 410) is used to implement the fault injection mechanism. The CPLD 410 contains programmable logic to allow a hardware designer to implement a design choice of a specific feature. The CPLD 410 is connected (either directly or indirectly) to a test object on the circuit board. In the scenario where the circuit board is the I/O module 210, the test object may be a microprocessor 480, a communication path (illustratively, an $I^2C$ bus 485 or an address bus 475), an Application-Specific Integrated Circuit 490, or other shelf electronics 495. For illustration purposes, the microprocessor 480 is used as a test object in the following description. However, it is understood that an error can be induced in any hardware component on the I/O module 210. Illustratively, the $I^2C$ communication link 485 can be shorted to cause the link to be unable to communicate, or the clock on that link can be removed to cause it to malfunction.

The microprocessor 480 on the I/O module 210 receives a clock signal at its input port. Under normal operations, the CPLD 410 is programmed to provide the clock input with a direct link to a clock source, such as a crystal oscillator 421. During testing, the CPLD 410 can be used to remove the clock signal from the microprocessor 480 and connects the clock input to the ground 422. Thus, in this scenario, the CPLD 410 serves as a multiplexer that can be controlled to select the ground 422 or crystal oscillator 421. Similarly, the CPLD 410 can be programmed to hold a test object in reset, by connecting the reset input of the test object to a constant voltage 423 and bypassing the normal reset signal source 424. The CPLD 410 can also be programmed to control a Field Effect Transistor (FET) 425, which can remove power from a device as needed. Grounding the clock input, holding the reset input enabled, and removing power, are some of the examples that will cause the microprocessor 480 to fail in a deterministic manner.

In one embodiment, the CPLD 410 is programmed to map an input bit pattern to a predetermined connection between an input port of a test object and a signal source. This mapping can be re-programmed when a different test scenario is desired. The CPLD 410 receives, illustratively, a 16-bit input pattern, which uniquely selects a predetermined connection between an input port of a test object (such as a clock input or a reset input) and a signal source (such as the crystal oscillator 421, the ground 422, the constant voltage 423, or the normal reset signal source 424). In one embodiment, the 16-bit input of the CPLD 410 is connected to a constant signal source 435 via a switch 431, such as a DIP switch. The switch 431 can be configured, manually or automatically, to an open state or a close state at each bit location, which correspond to "0" or "1". Thus, the switch 431 is able to convert the constant signal source 435 into a "0" and "1" bit pattern at the input of the CPLD 410, and to cause a predetermined fault to be injected to the test object.

Figure 4B:
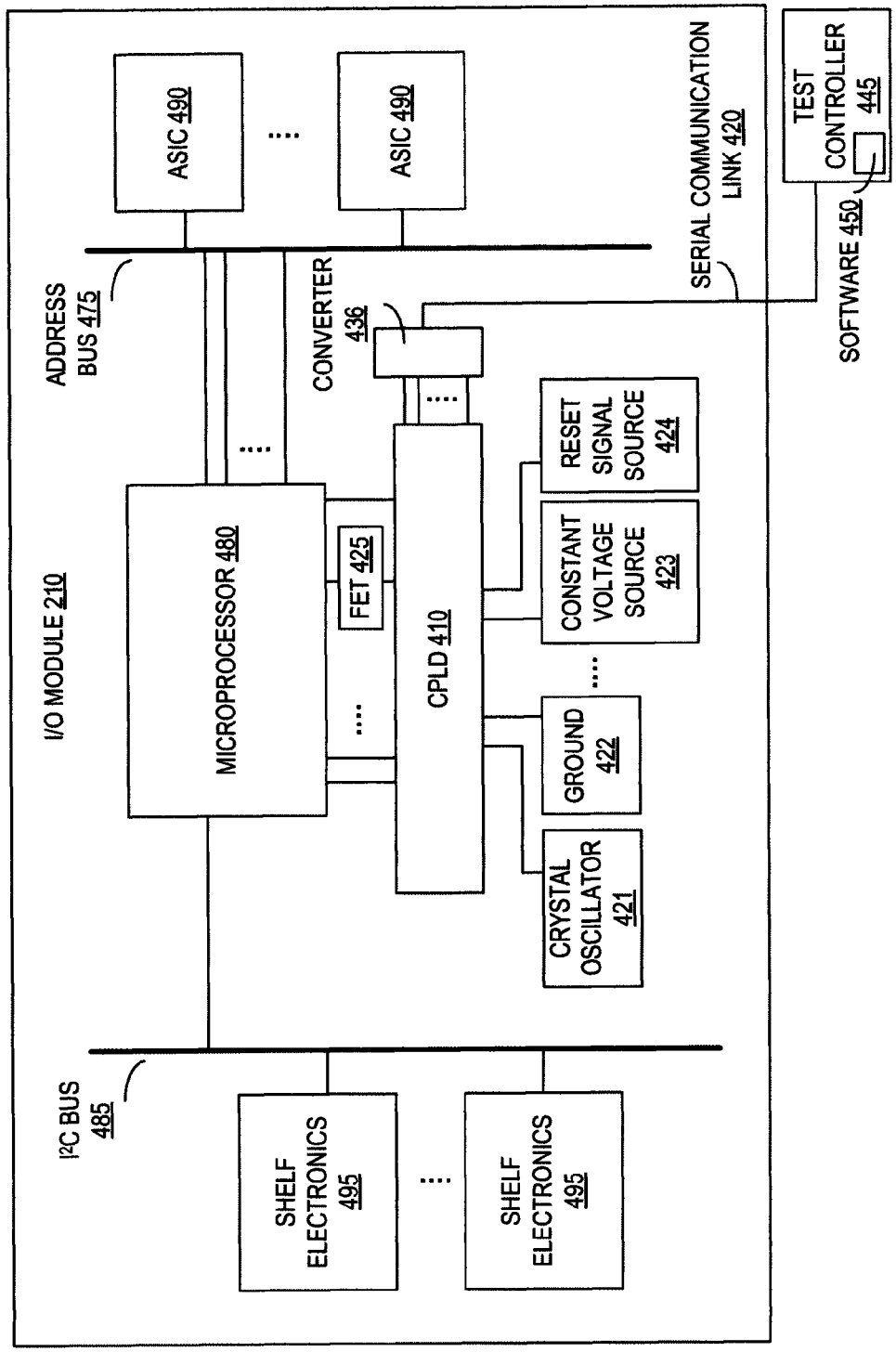
FIG. 4B is a block diagram illustrating another embodiment of a fault injection mechanism implemented in a hardware module of the storage shelf.

In an alternative embodiment as shown in FIG. 4B, a serial communication link 420, such as a Universal Serial Bus (USB) or RS-232 link, connects the CPLD 410 to a test controller 445 via a converter circuit 436. The converter circuit 436 may be an integrated circuit, such as a universal asynchronous receiver/transmitter (UART), which converts a serial bit sequence at the output of the test controller 445 into a parallel bit pattern at the input of the CPLD 410. The test controller 445 executes a software component 450, which includes instructions to cause the test controller 445 to generate predetermined bit sequences to induce deterministic faults in the test object. The software component 450 can be programmed to automatically inject faults into a test object when an anomaly is suspected. Moreover, the test controller 445 can be connected to all of the circuit modules on all of the shelves 200 that implement the fault injection mechanism described above. The software component 450 can be programmed to cause the test controller 445 to inject a predetermined bit pattern into any specific circuit module on any specific shelf 200. Thus, automated testing can be performed during critical failure conditions. The software component 450 can also be programmed to inject faults into a specific circuit module on a specific shelf 200 in response to a command issued by an administrator.

When a hardware component in any of the storage shelves 200 fails, an error status is automatically sent to the enclosure services processor 355 of FIG. 3 within the shelf 200 for verification. After verification, the enclosure services processor 355 reports the error to the storage server 100 for analysis and recovery measures. Error status may be generated by a standard error handling mechanism. Illustratively, if the $I^2C$ communication link 485 stops communicate, it will result in a driver retrying the PO's, which, in turn, will escalate to an error status about a hardware component being "unavailable"

or "set critical," as defined in the SCSI Enclosure Services Standard. In an embodiment where storage shelves 200 are coupled to the visual indicators 260, one or more of the visual indicators 260 may be activated by the enclosure services processor 355 to indicate the fault condition. In some scenarios, failsafe circuits will be used to activate the visual indicators 260 when the enclosure services processor 355 is not responsive. Thus, the use of the failsafe circuits allows the detection of a fault in the enclosure services processor 355 itself.

The deterministic fault injection mechanism helps to verify that the error status is correctly reported. The verification may be performed by an operator of the storage server 100, or by the enclosure services processor 355 within each shelf. In some scenarios, the verification can also be performed by software, such as the operating system (or other software) of the storage server 100, or by hardware, such as a verification circuit residing in the storage server 100, or on a test bed external to the storage server 100.

Figure 5:
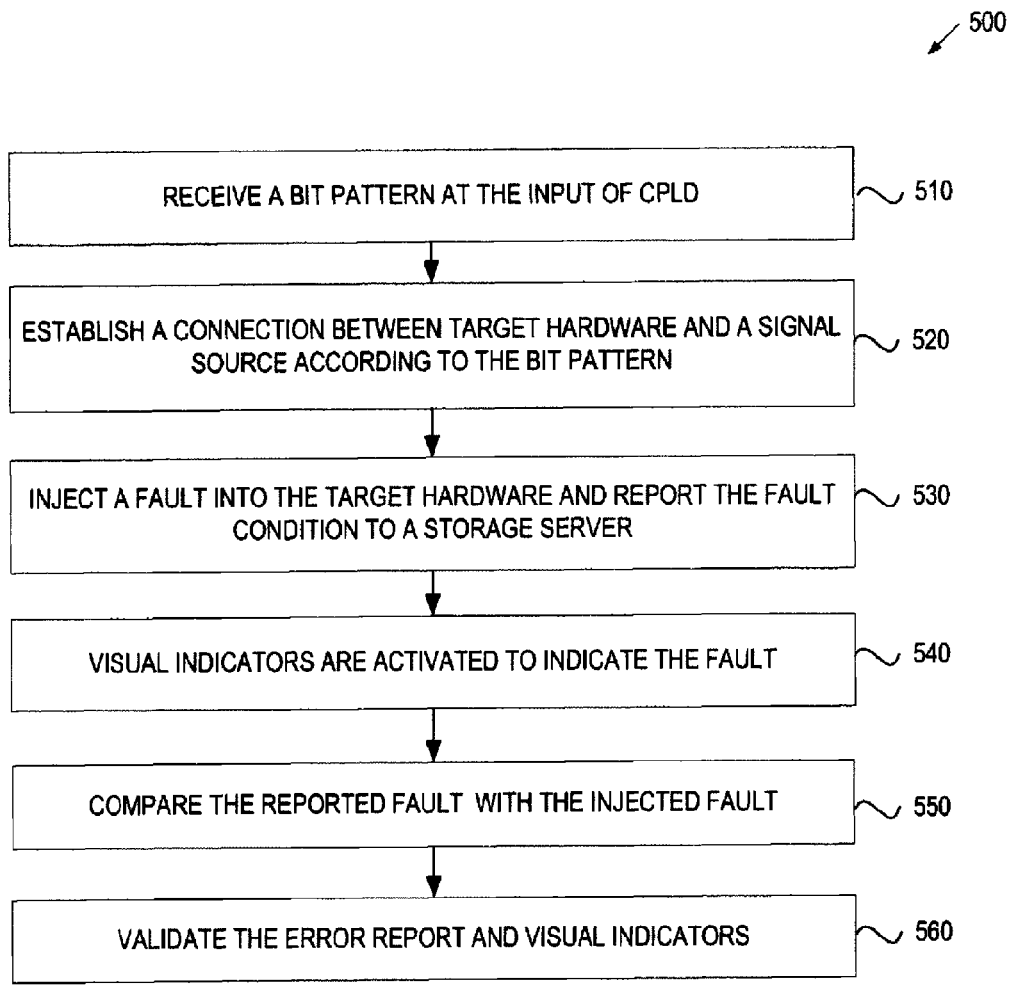
FIG. 5 is a flow diagram illustrating an embodiment of a process for injecting a fault into an I/O module of the storage shelf.

The fault injection mechanism described above ensures that the hardware will fail. The mechanism allows an engineer to deterministically cause hardware failures, and prove that the failures can be identified and isolated properly. FIG. 5 is a flowchart illustrating a process 500 for injecting a fault into a hardware component, in accordance with an embodiment of the present invention. The process 500 begins at block 510 in which a bit pattern is generated at the input of the CPLD 410. As mentioned above with reference to FIG. 4, the bit pattern may be generated by a programmable switch or programmable software on a test controller. At block 520, the CPLD 410 establishes a connection between an input port of the hardware component and a signal source according to the input bit pattern. The connection determines whether a deterministic fault is to be injected to the input port of the hardware component. At block 530, the enclosure services processor 355 sends an error report to the storage server 100 if a fault condition occurs. In some embodiments where visual indicators 260 are used to indicate fault conditions, at block 540, appropriate visual indicators 260 are activated, by the enclosure services processor 355 or failsafe circuits, to indicate that a specific storage shelf 200 has a failure. At block 550, the reported fault (as reported in the error report and/or indicated by the visual indicators 260) is compared with the deterministic fault that was injected. The comparison may be conducted by a system administrator or by the enclosure services processor 355. Illustratively, a system administrator may compare the activation of one or more visual indicators 260 with the injected fault condition. The enclosure services processor 355 may be configured to compare the test settings of the test controller 445 of FIG. 4B with the fault reported to the enclosure services processor 355 from the individual hardware components.

At block 560, the results of the comparison verify whether the reported fault is consistent with the injected fault. If the results indicate a difference (or inconsistency) between the injected fault and the reported fault, a system administrator may conduct an analysis of the inconsistency, e.g., by checking the hardware component where the fault occurs, to determine a recovery measures.

Figure 6:
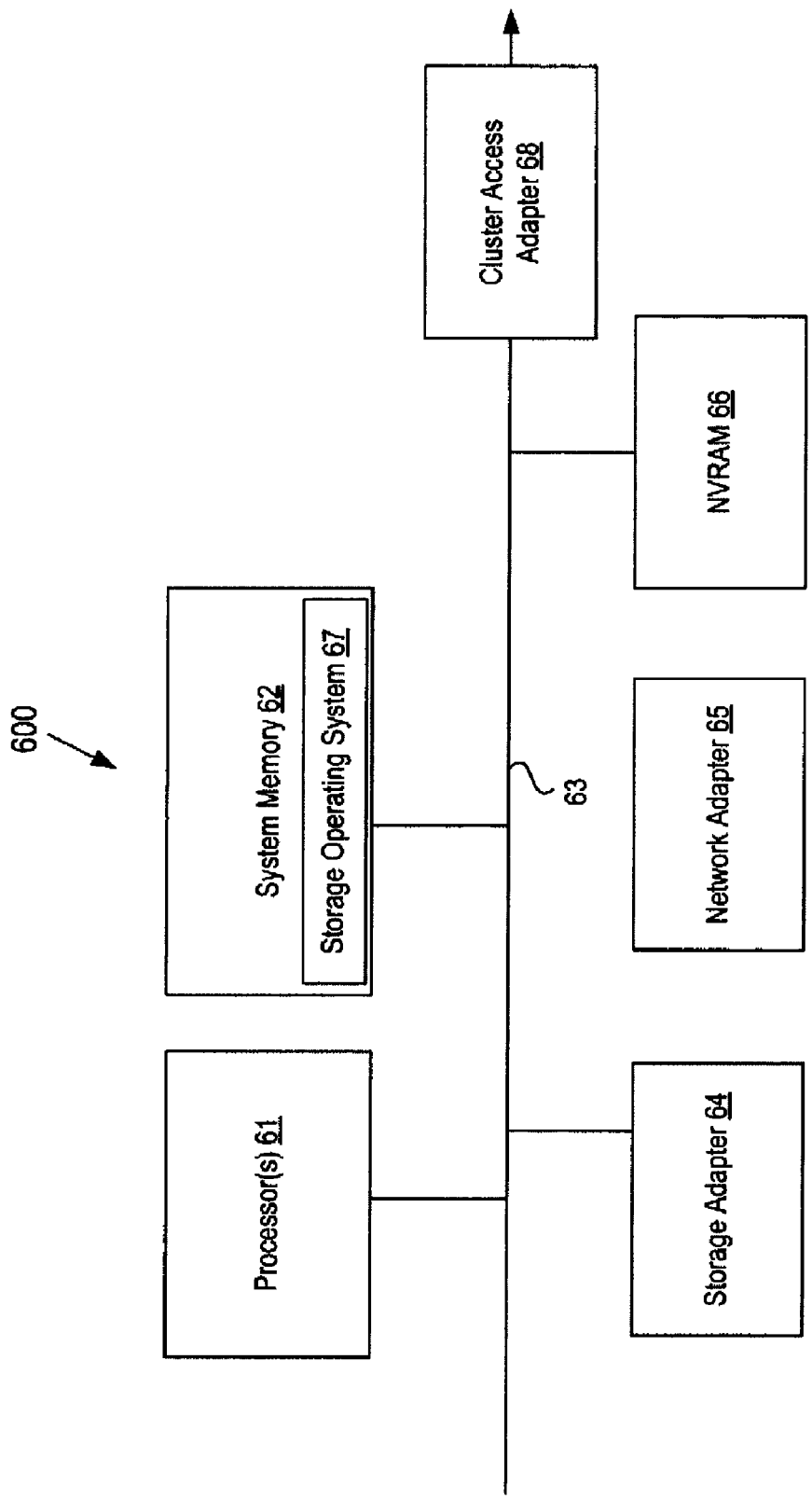
FIG. 6 shows an example of the hardware architecture of the storage server.

FIG. 6 is a block diagram showing an example of the architecture of the storage server 100 at a high level. Certain standard and well-known components, which are not germane to the present invention, are not shown. The storage server 100 includes one or more processors 61 and memory 62 coupled to a bus system 63. The bus system 63, as shown in FIG. 6, is an abstraction that represents any one or more separate physical buses and/or point-to-point connections, connected by appropriate bridges, adapters and/or controllers. The bus system 63, therefore, may include, for example, a system bus, a form of Peripheral Component Interconnect (PCI) bus, HyperTransport or industry standard architecture (ISA) bus, small computer system interface (SCSI) bus, universal serial bus (USB), Inter-IC ($I^2C$) bus, or Institute of Electrical and Electronics Engineers (IEEE) standard 1394 bus (sometimes referred to as "Firewire").

The processors 61 are the central processing units (CPUs) of the storage server 100 and, thus, control its overall operation. In certain embodiments, the processors 61 accomplish this by executing software stored in memory 62. Such processors 61 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 62 includes the main memory (i.e., the "system memory") of the storage server 100. Memory 62 represents any form of random access memory (RAM), read-only memory (ROM), flash memory, or the like, or a combination of such devices. Memory 62 stores (among other things) a storage operating system 67, which manages the storage subsystem 130 of FIG. 1. In one embodiment, the storage operating system 67 performs test validation to verify the consistency between a reported fault with an injected fault as described above.

Also connected to the processors 61 through the bus system 63 are a storage adapter 64, a network adapter 65 and a cluster access adapter 68. The storage adapter 64 allows the storage server 100 to access the storage subsystem 130 of FIG. 1, and may be, for example, a Fibre Channel adapter or a SCSI adapter. The network adapter 65 provides the storage server 100 with the ability to communicate with remote devices, such as the clients 110, over a network and may be, for example, an Ethernet adapter, a Fibre Channel adapter, or the like. The cluster access adapter 68 couples the storage server 100 to other nodes of the cluster over a cluster switching fabric.

The storage server 100 also includes a non-volatile random access memory (NVRAM) 66 to provide fault-tolerant backup of data. The NVRAM 66 is typically a large-volume solid-state memory array having either a backup battery, or other built-in last-state-retention capabilities (e.g. a FLASH memory), that holds the last state of the memory in the event of any power loss to the array.

Thus, a method and system for deterministic fault injection into storage shelves have been described. Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   injecting a known fault condition on demand into a hardware component in a storage shelf to cause a failure of the storage shelf, the hardware component incorporating a circuit that is configurable to select between a normal operating condition and a faulty condition of the hardware component;
   verifying that a failure caused by injecting the known fault condition is consistent with the known fault condition; and
   reporting, by an enclosure services processor in the storage shelf, the failure to a storage server.

2. The method of claim 1, wherein injecting the known fault condition comprises:
   controlling a programmable logic device to select a connection path between an input port of the hardware component and one of a plurality of signal sources, the signal sources including a normal signal source for normal operations of the hardware component and a faulty signal source for fault injections.

3. The method of claim 1, wherein injecting the known fault condition further comprises:
   removing power from the hardware component.

4. The method of claim 1, wherein verifying that the failure is consistent with the known fault condition further comprises:
   verifying that one or more visual indicators are activated, consistently with the known fault condition, to indicate the failure of the storage shelf.

5. The method of claim 1, wherein verifying that the failure is consistent with the known fault condition further comprises:
   verifying that a report received at the storage server is consistent with the known fault condition.

6. The method of claim 1, where injecting a known fault condition further comprises:
   integrating a programmable logic device onto a hardware module that includes the hardware component; and
   sending a bit pattern to the programmable logic device to control an injection of the known fault condition.

7. The method of claim 1, where injecting a known fault condition further comprises:
   automating an injection of the known fault condition with software executed by a test controller external to the hardware module.

8. The method of claim 1, where injecting a known fault condition further comprises:
   controlling an injection of the known fault condition with a switch that generates a bit pattern; and
   sending the bit pattern into a programmable logic device to select the known fault condition.

9. The method of claim 1, wherein the normal operating condition is a condition in which the hardware component functions as designed without generating a fault.

10. A method comprising:
    receiving, at a programmable logic device in a storage shelf, a bit pattern that uniquely selects one of known fault conditions for a hardware component in the storage shelf of a networked storage environment; and
    in response to the bit pattern, establishing a connection between an input port of the hardware component and a signal source to cause the selected one known fault condition to occur in the hardware component, wherein establishing a connection comprises one of holding a reset line of the hardware component enabled and grounding a clock line of the hardware component.

11. A system comprising: a storage server; and a storage shelf coupled to the storage server, the storage shelf including a plurality of hardware modules and a mass storage device, one or more of the hardware modules including a programmable circuit to establish, in response to an input to the programmable circuit, a connection between a hardware component in the storage shelf and a faulty signal source that induces a known fault condition, wherein the hardware modules further include an enclosure services processor to report a failure to the storage server, the failure to be verified with the known fault condition.

12. The system of claim 11, wherein the hardware component includes a microprocessor, a communication link, an application-specific integrated circuit (ASIC), or shelf electronics.

13. The system of claim 11, further comprising:
    a switch to generate a bit pattern to the input of the programmable circuit, the bit pattern uniquely identifying the known fault condition and causing the faulty signal source to be selected.

14. The system of claim 11, further comprising:
    a test controller external to the hardware modules, the test controller to execute a software component to generate a bit pattern to the input of the circuit, the bit pattern uniquely identifying the known fault condition and causing the faulty signal source to be selected.

15. The system of claim 11, further comprising:
    a plurality of visual indicators associated with the storage shelves, one or more of the visual indicators configured to be activated by a failsafe circuit in response to the fault induced by the faulty signal source when the enclosure services processor is not responsive.

16. The system of claim 11, wherein the programmable circuit includes programmable logic to select, in response to the input to the programmable circuit, a connection path between an input port of the hardware component and one of a plurality of signal sources, the signal sources including a normal signal source for normal operations of the hardware component and the faulty signal source for fault injections.

* * * * *